(12) United States Patent
Negami

(10) Patent No.: US 12,269,907 B2
(45) Date of Patent: Apr. 8, 2025

(54) RUBBER COMPOSITION CONTAINING ETHYLENE-PROPYLENE-NONCONJUGATED POLYENE COPOLYMER

(71) Applicant: NOK CORPORATION, Tokyo (JP)

(72) Inventor: Tetsuro Negami, Tottori (JP)

(73) Assignee: NOK CORPORATION (JP)

( * ) Notice: Subject to any disclaimer, the term of this patent is extended or adjusted under 35 U.S.C. 154(b) by 744 days.

(21) Appl. No.: 17/053,271

(22) PCT Filed: May 28, 2019

(86) PCT No.: PCT/JP2019/021034
§ 371 (c)(1),
(2) Date: Nov. 5, 2020

(87) PCT Pub. No.: WO2019/230699
PCT Pub. Date: Dec. 5, 2019

(65) Prior Publication Data
US 2021/0238324 A1 Aug. 5, 2021

(30) Foreign Application Priority Data

May 29, 2018 (JP) .................. 2018-102563

(51) Int. Cl.
*C08F 210/18* (2006.01)
*C08F 210/06* (2006.01)
*C08F 210/16* (2006.01)
*C08K 3/06* (2006.01)
*C08K 5/14* (2006.01)
*C08K 5/47* (2006.01)
*F16F 1/36* (2006.01)

(52) U.S. Cl.
CPC .......... *C08F 210/16* (2013.01); *C08F 210/06* (2013.01); *C08K 3/06* (2013.01); *C08K 5/14* (2013.01); *C08K 5/47* (2013.01); *F16F 1/3605* (2013.01); *F16F 2224/025* (2013.01)

(58) Field of Classification Search
CPC .................................... C08F 210/16–18
See application file for complete search history.

(56) References Cited

U.S. PATENT DOCUMENTS

| | | | | |
|---|---|---|---|---|
| 4,252,909 A | * | 2/1981 | Honma | C08K 3/06 521/89 |
| 4,743,656 A | * | 5/1988 | Wingrove | C08K 5/14 526/233 |
| 4,767,809 A | * | 8/1988 | Wingrove | C08L 21/00 524/254 |
| 4,973,627 A | * | 11/1990 | Mitchell | C08L 21/00 525/237 |
| 5,610,254 A | * | 3/1997 | Sagane | C08K 5/09 526/170 |
| 5,698,651 A | * | 12/1997 | Kawasaki | C08F 210/18 526/170 |
| 5,837,791 A | * | 11/1998 | Sagane | C07C 11/21 526/348.3 |
| 2004/0002564 A1 | * | 1/2004 | Wentworth | C08K 5/101 524/306 |
| 2004/0127616 A1 | * | 7/2004 | Wentworth | C08L 59/00 524/284 |
| 2008/0207786 A1 | * | 8/2008 | Suzuki | C08J 9/0023 521/89 |
| 2014/0296011 A1 | * | 10/2014 | Yoshida | F16G 5/08 264/172.19 |
| 2016/0002383 A1 | | 1/2016 | Beek | |
| 2016/0152796 A1 | * | 6/2016 | Beelen | C08L 91/00 524/554 |
| 2016/0347894 A1 | * | 12/2016 | Endo | C09K 3/1006 |
| 2018/0022903 A1 | | 1/2018 | Kotani | |
| 2018/0134864 A1 | | 5/2018 | Cao et al. | |
| 2019/0153206 A1 | * | 5/2019 | Van Duin | C08L 23/16 |

FOREIGN PATENT DOCUMENTS

| | | |
|---|---|---|
| CN | 101220184 A | 7/2008 |
| CN | 103289215 A | 9/2013 |
| CN | 103304901 A | 9/2013 |
| DE | 3033671 A1 | 3/1981 |
| EP | 171154 A1 | 2/1986 |
| EP | 171154 B1 | 9/1989 |
| EP | 3467341 A1 | 4/2019 |
| JP | S6114239 B2 | 4/1986 |

(Continued)

OTHER PUBLICATIONS

Extended European Search Report for corresponding Application No. 19810492.9 dated Feb. 14, 2022 (6 Pages).

(Continued)

*Primary Examiner* — Matthew E. Hoban

(74) *Attorney, Agent, or Firm* — Harness, Dickey & Pierce, P.L.C.

(57) ABSTRACT

A rubber composition is provided which is excellent in crosslinking characteristics and processability and is excellent in durability and heat resistance after crosslinking by using a sulfur-based crosslinking agent and a peroxide crosslinking agent in combination. The rubber composition includes 100 parts by mass of ethylene-propylene non-conjugated polyene copolymer, 1 to 3 parts by mass of peroxide crosslinking agent, and 0.1 to 0.6 parts by mass of thiazole-based crosslinking promoter. A content ratio of propylene is 30 to 55 percent by the total content of ethylene and propylene in the EPDM polymer.

9 Claims, No Drawings

(56) References Cited

FOREIGN PATENT DOCUMENTS

| | | |
|---|---|---|
| JP | S62143946 A | 6/1987 |
| JP | S62181345 A | 8/1987 |
| JP | H04504877 A | 8/1992 |
| JP | H0920836 A | 1/1997 |
| JP | H10110070 A | 4/1998 |
| JP | 2016514746 A | 5/2016 |
| JP | 2016128551 A | 7/2016 |
| JP | 2017211084 A | 11/2017 |
| JP | 2018513254 A | 5/2018 |

OTHER PUBLICATIONS

Mitsui Chemicals: "Mitsui EPT", Apr. 30, 2014, retrieved from the Internet: URL:http://jp.mitsuichem.com/service/pdf/mitsui-ept_e.pdf, Retrieved on May 18, 2017, 14 pages.
International Search Report and Written Opinion of the International Searching Authority issued in PCT/JP2019/021034, mailed Jul. 9, 2019, Japanese; ISA/JP.
Office Action issued for the corresponding Chinese Pat. Application No. 201980012842.X; received on Jul. 5, 2022 (total 11 pages).

* cited by examiner

RUBBER COMPOSITION CONTAINING ETHYLENE-PROPYLENE-NONCONJUGATED POLYENE COPOLYMER

CROSS REFERENCE TO RELATED APPLICATIONS

This application is a U.S. National Phase application of International Application No. PCT/JP2019/021034, filed on May 28, 2019, which claims priority to Japanese Patent Application No. 2018-102563, filed on May 29, 2018. The entire disclosures of the above applications are expressly incorporated by reference herein.

BACKGROUND

Technical Field

The present disclosure relates to a rubber composition containing an ethylene-propylene-nonconjugated polyene copolymer.

Related Art

Rubber members which are used for a vibration-insulating rubber or the like need to have good durability and heat resistance. In order to improve durability, a sulfur-based crosslinking agent was often selected as a crosslinking agent while a peroxide crosslinking agent was often selected as a crosslinking agent to improve heat resistance, conventionally. However, having both durability and heat resistance had been difficult because durability and heat resistance are in a trade-off relationship.

In such circumstances, prior arts attempted to manage both durability and heat resistance by using a sulfur-based crosslinking agent and a peroxide crosslinking agent in combination. JPA-H-9-20836, for example, discloses a durable rubber composition formed by mixing organic peroxide, sulfur, a benzothiazole-based vulcanization promoter and tetrakis(2-ethylhexyl) thiuram disulfide to a natural rubber or a diene-based synthetic rubber.

However, managing both durability and heat resistance was difficult and a stable rubber molded article was not obtained because both cross-linking agents have different characters respectively in a molding process and some defects such as scorching, liquidity and poor jointing occurred.

The present disclosure has been made in a view of such circumstances. Therefore, an object of the present disclosure is to provide a rubber composition which is excellent in crosslinking characteristics and processability and excellent in durability and heat resistance after crosslinking by using a sulfur-based crosslinking agent and a peroxide crosslinking agent in combination.

SUMMARY

The inventor of the present disclosure adopted an ethylene propylene non-conjugated polyene copolymer which has an excellent balance of heat resistance, cold resistance, durability, temperature dependency of a spring constant (E') and repulsive stress as a main rubber component of a rubber composition. The ethylene propylene non-conjugated polyene copolymer may be described as an EPDM polymer below appropriately.

The inventor of the present disclosure tested rubber compounding formulations and has found out that the problem mentioned above was solved by a specific compounding formulation by using an EPDM polymer with specific formulations and specific crosslinking promoters, which resulted in that the present inventor had reached the present disclosure. Namely, the present disclosure has the following structure.

A rubber composition of the present disclosure contains 100 parts by mass of an EPDM polymer, 1 to 3 parts by mass of a peroxide cross-linking agent, 0.1 to 0.8 parts by mass of sulfur and 0.1 to 0.6 parts by mass of a thiazole-base crosslinking promoter wherein a content ratio of propylene is 30 to 55 percent by the total content of ethylene and propylene in the EPDM polymer.

The thiazole-based crosslinking promoter is preferably dibenzothiazyl disulfide in the rubber composition of the present disclosure. Further, the rubber composition of the present disclosure preferably has more than 0.9 minutes of t10 which indicates crosslinking characteristics at 170° C., 15.0 MPa or more of tension strength after crosslinking, 400 percent or more of elongation after crosslinking and 50 percent or less of compression set at 100° C. at 22 hours after crosslinking. Furthermore, hardness after crosslinking is preferably 20 to 90 of JIS A hardness. Furthermore, the rubber composition of the present disclosure is suitable for a vibration-insulating rubber, especially suitable for a coupling portion (isolation portion) of a rotational variation absorbing damper.

Effects

A rubber composition of the present disclosure uses a sulfur-based crosslinking agent and a peroxide crosslinking agent in combination and the composition is excellent in crosslinking characteristics and processability and is excellent in durability and heat resistance after crosslinking.

DETAILED DESCRIPTION

Hereinafter, embodiments of the present disclosure is described in detail. However, the scope of the present disclosure is not limited to the embodiments as examples described below.

Rubber compositions of the present embodiments are rubber compositions containing an EPDM polymer, a peroxide crosslinking agent, sulfur and a thiazole-based crosslinking promoter. Each component forming the rubber composition will be described below.

EPDM Polymer

EPDM polymer is excellent in heat resistance, cold resistance, durability, temperature dependency of a spring constant and a balance of repulsive stress and is suitable for a vibration-insulating rubber or the like. Further, EPDM polymer is excellent in processing performance, weather resistance, ozone resistance chemical resistance or the like.

Among the EPDM polymer, a rubber is used. The rubber has a content ratio of propylene to the total content of ethylene and propylene in the EPDM polymer is 30 to 55 percent. When a content ratio of propylene is below 30 percent, low-temperature characteristics can be worse because of the crystallizations of ethylene chains. On the other hand, when a content ratio of propylene is over 55 percent, low-temperature characteristics can be worse because of the crystallization of propylene chains. Worse low-temperature characteristics of EPDM polymer would cause vibration-insulation characteristics and a compression set to be deteriorated at lower temperatures. When an EPDM polymer has 30 to 55 percent of the content ratio of propylene to the total amount of ethylene and propylene, multiple kinds of EPDM polymers may be mixed together for use. Namely, even though some EPDM polymer of EPDM polymers mixed for use are unsatisfied with the content ratio of propylene to the total amount of ethylene and propylene, it is acceptable if the EPDM polymer as a whole is satisfied with the range of the values.

As a non-conjugated polymer of the EPDM polymer, a nonconjugated diene chain, nonconjugated diene ring and triene are given. The nonconjugated diene chain is 1,4-hexadiene, 3-methyl-1,4-hexadiene, 4-mehtyl-1,4-hexadiene, 5-methyl-1,4-hexadiene, 4,5-dimethyl-1,4-hexadiene, 7-methyl-1,6-octadiene or the like. The nonconjugated diene ring is methyl-tetrahydroindene, 5-binyl-2-norbornene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, dicyclopentadiene or the like. The triene is 2,3-diiopropylidene-5-norbornene, 2-ethylidene-3-isopropylidene-5-norbornene, 2-propenyl-2,2-norbornadiene or the like. Nonconjugated polyene is not specifically limited but nonconjugated diene is preferable. Further, a norbornene compound is specifically preferable because a high crosslinking rate in a crosslinking reaction is available.

Mooney viscosity $ML_{1+4}$ (125° C.) of the EPDM polymer is preferably in a range of 20 to 80, more preferably 20 to 70. Both of a non-oil-extended polymer and an oil-extended polymer may be used as EPDM polymer.

Peroxide Crosslinking Agent

A known organic peroxide is usable as a peroxide cross-linking agent. As the peroxide agent, for example, dicumyl peroxide, t-butyl cumyl peroxide, 2,5-dimethyl-2,5-di(t-butylperoxy)hexane, α,α'-di(t-butylperoxy)diisopropylbenzene, 2,5-dimethyl-2,5-bis(t-butylperoxy)hexyne, 1,1-di(t-hexylperoxy)cyclohexane, 1,1-di(t-butylperoxy) cyclohexane, 2,5-dimethyl-2,5-di(benzoyl peroxide)hexyne, t-hexylperoxy benzoate and t-butylperoxy benzoate are given. 1 to 3 parts by mass of a peroxide cross-linking agent is compounded to 100 parts by mass of EPDM polymer. The compounding amount of the peroxide cross-linking agent per 100 parts by mass of the EPDM polymer is preferably 1 to 2.75 parts by mass, further preferably 1.0 to 2.5 parts by mass, more preferably 1.3 to 2.5 parts by mass. When the compounding amount of the peroxide crosslinking agent is below 1 part by mass, a decrease of a compression set (fatigue) is concerned. When the compounding amount of the peroxide crosslinking agent is over 3 parts by mass, a decrease of durability is concerned.

Sulfur 0.1 to 0.8 parts by mass of sulfur which is used as a sulfur-based crosslinking agent is compounded to 100 parts by mass of a EPDM polymer. The compounding amount of sulfur is preferably 0.1 to 0.6 parts by mass, more preferably 0.1 to 0.4 parts by mass. When the compounding amount of sulfur is below 0.1 parts by mass, an improving effect of durability is small. When the compounding amount of sulfur is over 0.8 parts by mass, a decrease of blooming and heat resistance (a compression set) is considered.

Thiazole-Based Cross-Linking Promoter

A thiazole-based cross-linking promoter is used as a crosslinking promoter in a rubber composition of the present embodiment. The thiazole-based cross-linking promoter is a compound with a thiazole structure and has an excellent effect of improving machinery strength and durability of a cross-linking rubber. As a thiazole-based cross-linking promoter, specifically, dibenzothiazyldisulfide, 2-mercaptobenzothiazole, a zinc salt of 2-mercaptobenzothiazole, a cyclohexylamine salt of 2-mercaptobenzothiazole and 2-(4'-morpholinodithio)benzothiazole are given. Among them, dibenzothiazyldisulfide is preferable because it has a good heat resistance and scorch stability.

The thiazole-based crosslinking promoter works supplementary in a crosslinking reaction with a peroxide crosslinking agent. The thiazole-based crosslinking promoter prevents a delay of a t90 of cross-linking characteristics and makes a t10 of crosslinking characteristics significantly delay. This adjusts a crosslinking rate of the peroxide crosslinking agent moderately. 0.1 to 0.6 parts by mass of the thiazole-based crosslinking agent is compounded to 100 parts by mass of EPDM polymer. The compounding amount of the thiazole-based crosslinking promoter per 100 parts by mass of EPDM polymer is preferably 0.1 to 0.45 parts by mass and more preferably 0.1 to 0.3 parts by mass. When the compounding amount of the thiazole-based crosslinking promoter is below 0.1 parts by mass, the effect of delaying (increasing) the t10 of cross-linking characteristics is small and forming performance decreases. On the other hand, when the compounding amount of the thiazole-based crosslinking promoter is over 0.6 parts by mass, the effect of delaying the t10 of crosslinking characteristics decreases and crosslinking inhibition may occur with an increase of the amount of added thiazole-based crosslinking promoter.

Multiple kinds of the thiazole-based crosslinking promoters may be used in combination. Further, the thiazole-based crosslinking promoter and other kinds of crosslinking promoters may be used in combination as long as the effect of the present embodiment is not impeded.

Rubber Composition

A rubber composition of the present embodiment may contain a polymer other than EPDM polymer as long as the effect of the disclosure is not impeded. Further, a known various additive may be added to the rubber composition of the present embodiment. As a known additive, a reinforcement agent, an inorganic filler, a plasticizer, a softener, an anti-aging agent, a processing aid, a crosslinking aid, forming agent, a forming aid, a coloring agent, a dispersant, a flame retardant, a tackifier and a parting agent are given.

The rubber composition of the present embodiment preferably has more than 0.9 minutes of a t10 of crosslinking characteristics at 170° C. When the t10 of cross-linking characteristics at 170° C. is more than 0.9 minutes, the scorch (premature cross-linking) time is longer, the cross-linking characteristics are excellent and moldability and processability are excellent. The t10 of crosslinking characteristics at 170° C. is preferably more than 1 minute. The t10 of crosslinking characteristics at 170° C. may be measured by following JIS K 6300-2.

The tensile strength of the rubber composition of the present embodiment after crosslinking is preferably 15.0 MPa or more and the elongation (elongation at break) of the rubber composition after crosslinking is 400 percent or more. When the tensile strength after cross-linking is 15.0 MPa or more and the elongation after cross-linking is 400 percent or more, a machinery strength of the rubber is excellent. Consequently, the durability of the rubber is considered good and the rubber composition may be used for a vibration-insulating rubber or the like. The tensile strength after cross-linking is more preferably 16.0 MPa or more, further preferably 17.0 MPa or more. The elongation after cross-linking is more preferably 450 percent or more, further preferably 500 percent or more.

The hardness of the rubber composition of the present embodiment after cross-linking is preferably 20 to 90, more preferably 30 to 70, further preferably 30 to 60 of JIS A hardness. Physical properties in the normal state mentioned above, namely, tensile strength, elongation and hardness after crosslinking are indicators of excellent durability.

A compression permanent set of the rubber composition of the present embodiment at 100° C. at 22 hours after crosslinking is preferably 50 percent or less. When the compression permanent set is 50 percent or less, rubber properties are excellent and the rubber composition may be used for a vibration-insulating rubber or the like. The compression permanent set of the rubber composition at 100° C. at 22 hours after crosslinking is more preferably 48 percent or less. The compression permanent set (fatigue) is an indicator of excellent heat resistance.

Producing Method

In order to produce a rubber composition of the present embodiment, an uncrosslinked rubber composition is prepared at first. As a known production device, for example, a Bambury mixer, a kneader, a planetary mixer, an intermix, a two-roll and a three-roll are given. Predetermined materials are mixed and an uncrosslinked rubber composition is prepared. Then, a first crosslinking (vulcanization) is performed by heating generally at 150° C. to 200° C. for about 3 to 60 minutes by using a vulcanizing press, a compression molding device, an injection molding device or the like. Where necessary, a second crosslinking (vulcanization) may be performed by oven vulcanization at about 120° C. to 200° C. for about 1 to 24 hours. By above mentioned crosslinking, a crosslinked product of a rubber composition containing ethylene-propylene-non-conjugated polyene copolymer of the present embodiment is obtained.

A rubber composition of the present embodiment is excellent in heat resistance, durability, physical properties in the normal state, cross-linking characteristics, processability (kneading and blooming) and vibration insulation, and the important characteristics of a vibration-insulating rubber or the like are improved. A rubber composition of the present embodiment is suitable for being used, for example, as a member in an engine which requires durability in high temperature circumstance. As a member in an engine, for example, a rotational variation absorbing damper, a torsional damper, a coupling rubber, an engine mount, a grommet, or the like are given.

A crankshaft pulley disposed in an end of a crankshaft of an automobile engine sometimes has a rotational variation absorbing damper which has a function of smoothening a rotational variation of an engine when a driving force is transmitted to an auxiliary machine. The rotational variation absorbing damper has a vibration isolation function which transmits torque inputted from a crankshaft to a hub to the main body of a pulley at a coupling part while the rotational variation is absorbing damper is absorbing a rotational variation by a twist direction shearing and deformation function of a coupling rubber. The rubber composition of the present embodiment is especially suitable for a coupling rubber of a coupling part of a rotational variation absorbing damper.

Hereinafter, the present disclosure will be described referring to Examples. However, the present disclosure is not limited to those Examples.

EXAMPLES

Examples 1 to 8, Comparative Examples 1 to 8

Raw materials used in Examples are the following.
(i) EPDM polymer: oil extended EPDM, ARLANXEO Netherlands B.V., Keltan® 4869C
(ii) EPDM polymer: EPDM, JSR Corporation, EP35
(iii) Peroxide crosslinking agent: dicumyl peroxide, NOF Corporation, PERCUMYL® D
(iv) Thiazole-based crosslinking promoter: dibenzothiazyl_disulfide (MBTS), Ouchi Shinko Chemical Industrial Co., Ltd., NOCCELLER DM-10
(v) Thiuram-based crosslinking promoter: Tetraxis thiuram disulfide, Ouchi Shinko Chemical Industrial Co., Ltd., NOCCELLER TOT-N Preparing Test Pieces for Measuring the Properties Uncrosslinking rubber sheets of rubber compositions disclosed in Table 1 and Table 2 were prepared by mixing the materials by using a 3 L kneader and a 12-inch open roll. Then, the uncrosslinked rubber sheets were crosslinked under the condition of 170° C. of first crosslinking temperature and for t90 of each rubber material of crosslinking time by using a compression molding device and crosslinked rubber sheets with 2 mm thickness were obtained.

Evaluation Items

Crosslinking Characteristics

Uncrosslinked rubber sheets were used for evaluating crosslinking characteristics, by referring to JIS K 6300-2. t10s of times for 10 percent cross-linking and t90s of times for 90 percent cross-linking of were measured at 170° C. of test temperature for 20 minutes of test time.

Evaluation criteria: When t10 was 0.9 or more minutes, crosslinking characteristics were evaluated as "good" because the scorch time was long. When t10 was below 0.9 minutes, crosslinking characteristics were evaluated as "poor" because the scorch time was short. Further, when t90 was below 11 minutes, crosslinking characteristics were evaluated as "good" because the crosslinking time was short. When t90 was between 11 to 15 minutes, crosslinking characteristics were evaluated as "intermediate" because the crosslinking time was moderate. When t90 was 15 or more minutes, crosslinking characteristics were evaluated as "poor" because the crosslinking time was long.

Physical Properties in the Normal State

Physical properties in the normal state of crosslinked rubber sheets were evaluated.

Hardness: Peak values were measured as a moment of measuring time, by referring to JIS K 6253.

Tensile strength Ts (MPa): Tensile strength was measured following JIS K 6251.

Evaluation criteria: The tensile strength was evaluated as "excellent" when the strength was 17.0 or more MPa, "good" when the strength was 16.0 or more and below 17.0 MPa, "fair" when the strength was 15.0 or more and below 16.0 MPa and "poor" when the strength was below 15.0 MPa.

Elongation Eb (percent): Elongations were measured by following JIS K 6251.

Evaluation criteria: The elongation was evaluated as "excellent" when the elongation was 500 or more percent, "good" when the elongation was 450 or more percent and below 500 percent, "fair" when the elongation was 400 or more percent and below 450 percent and "poor" when the elongation was below 400 percent.

Heat Resistance

Big sample pieces for compression permanent sets (following JIS K 6262) were prepared by crosslinking under the same condition as that of crosslinked rubber sheet. The compression permanent sets were measured by following JIS K 6262. The condition of heat aging was at 100° C. for 22 hours.

Evaluation criteria: Heat resistance was evaluated as "good" when the compression permanent set was 50 or less percent.

Heat resistance was evaluated as "poor" when the compression permanent set was over 50 percent.

Viscoelasticity Properties

Viscoelasticity tests of crosslinked rubber sheets were performed by referring to JIS K 6394 corresponding to ISO 4664-1.

Shape and size of a test piece: a strip shape piece with 6 mm width and 2 mm thickness Condition of measurement: the distance between holders 20 mm, an average deformation 10 percent, a width of deformation swing 0.1 percent.

Temperature Dependency of E'

Storage modulus E' at 100 Hz was measured by using a spectrometer "DVE-V4" from UBM, at 60° C. and 120° C. under tensile stress and a ratio of E' (120° C.)/E' (60° C.) was evaluated. When the ratio of E' (120° C.)/E' (60° C.) was 0.7 or more, the temperature dependency of E' was evaluated as "qualified". The temperature dependency of E' is preferably 0.75 or more, further preferably 0.8 or more.

Tan δ

Tan δ at 100 Hz was measured at 60° C. by using a spectrometer "DVE-V4" from UBM. When the tan δ was 0.090 or more, the vibration-insulation was evaluated as "qualified".

Kneading Performance

Kneading performances of rubber compositions were evaluated by checking items (1) and (2) described below. When both of the two items were satisfied, the kneading performance was evaluated as "qualified". When any one of the items was not satisfied, the kneading performance was evaluated as "disqualified".

(1) Kneading time was within 30 minutes.
(2) A kneading machine was not contaminated after the rubber paste was ejected.

Blooming

The surfaces of test pieces left for 24 hours were observed after crosslinking in the first crosslinking condition (170° C. of crosslinking temperature, 90 minutes of crosslinking time). The degrees of blooming on the surfaces of crosslinked rubber samples were evaluated as described (1) to (3).

(1) When no blooming was observed on the surface of a test piece by visual observation, the degree of blooming was evaluated as "good".
(2) When a little blooming was observed on the surface of a test piece by visual observation, but the blooming was not a problem for practical use, the degree of blooming was evaluated as "fair".
(3) When blooming was observed on the surface of a test piece by visual observation and the test piece had a huge tackiness and was difficult to use, the degree of blooming was evaluated as "poor".

The results of the evaluations are in Table 1 and Table 2.

TABLE 1

| | Items | Content | | Example 1 | Example 2 | Example 3 | Example 4 | Example 5 | Example 6 | Example 7 | Example 8 |
|---|---|---|---|---|---|---|---|---|---|---|---|
| Compounding ingredients | EPDM polymer | Keltan4869C | parts by mass | 90 | 90 | 90 | 90 | 90 | 90 | 90 | 90 |
| | | EP35 | parts by mass | 55 | 55 | 55 | 55 | 55 | 55 | 55 | 55 |
| | Sulfur | Sulfur | parts by mass | 0.1 | 0.1 | 0.1 | 0.1 | 0.2 | 0.4 | 0.8 | 0.8 |
| | Peroxide crosslinking agent | PERCUMYL D | parts by mass | 1.0 | 2.0 | 2.5 | 2.75 | 1.5 | 2.5 | 2.5 | 3 |
| | Thiazole-based crosslinking promorter | NOCCELLER DM-10 | parts by mass | 0.1 | 0.1 | 0.1 | 0.1 | 0.1 | 0.3 | 0.6 | 0.6 |
| | Thiuram-based crosslinking promorter | NOCCELLER TOT-N | parts by mass | — | — | — | — | — | — | — | — |
| EPDM properties | EPDM polymer (exclude extended oil) | | parts by mass | 100 | 100 | 100 | 100 | 100 | 100 | 100 | 100 |
| | Extended oil | | parts by mass | 45 | 45 | 45 | 45 | 45 | 45 | 45 | 45 |
| | Propylene/(Ehylene + Propylene) | | % | 38.3 | 38.3 | 38.3 | 38.3 | 38.3 | 38.3 | 38.3 | 38.3 |
| | $ML_{1+4}$(125° C.) | | | 50.8 | 50.8 | 50.8 | 50.8 | 50.8 | 50.8 | 50.8 | 50.8 |
| Crosslinking properties | t10 | t10 | min | 1.43 | 1.06 | 1.03 | 1.05 | 1.13 | 1.22 | 1.25 | 1.33 |
| | | Evaluation of t10 | | Good | Good | Good | Good | Good | Good | Good | Good |
| | t90 | t90 | min | 10.9 | 8.45 | 8.16 | 8.24 | 9.15 | 8.64 | 9.36 | 9.29 |
| | | Evaluation of t90 | | Good | Good | Good | Good | Good | Good | Good | Good |
| Physical properties in the normal state | Hardness | Hs, Duro A | | 49 | 51 | 52 | 53 | 50 | 49 | 49 | 49 |
| | Tensile strength, Ts | Ts | Mpa | 18.4 | 19.0 | 18.4 | 18.0 | 20.9 | 24.9 | 27.2 | 27.2 |
| | | Evaluation of Ts | | Excellent | Excellent | Excellent | Excellent | Excellent | Excellent | Excellent | Excellent |
| | Elongation, Eb | Eb | % | 760 | 550 | 450 | 410 | 690 | 700 | 740 | 720 |
| | | Evaluation of Eb | | Excellent | Excellent | Excellent | Excellent | Excellent | Excellent | Excellent | Excellent |
| Heat resistance | Compression set, CS | CS | % | 32 | 20 | 16 | 15 | 31 | 38 | 47 | 45 |
| | | Evaluation of CS | | Good | Good | Good | Good | Good | Good | Good | Good |

TABLE 1-continued

| | Items | Content | Example 1 | Example 2 | Example 3 | Example 4 | Example 5 | Example 6 | Example 7 | Example 8 |
|---|---|---|---|---|---|---|---|---|---|---|
| Viscoelasticity properties | E'(120° C.)/E'(60° C.) | | 0.8 | 0.88 | 0.92 | 0.94 | 0.84 | 0.86 | 0.89 | 0.89 |
| | tanδ(60° C.) | | 0.138 | 0.119 | 0.111 | 0.107 | 0.128 | 0.127 | 0.128 | 0.132 |
| Processability | Kneading performance | Evaluation of kneafing performance | Good | Good | Good | Good | Good | Good | Good | Good |
| | Blooming | Evaluation of blooming | Good | Good | Good | Good | Good | Good | Fair | Fair |

TABLE 2

| | Items | Content | | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|---|
| Compounding ingredients | EPDM polymer | Keltan4869C | parts by mass | 90 | 90 | 90 | 90 | 90 | 90 | 90 | 90 |
| | | EP35 | parts by mass | 55 | 55 | 55 | 55 | 55 | 55 | 55 | 55 |
| | Sulfur | Sulfur | parts by mass | 0 | 0.1 | 0 | 1.0 | 0.1 | 1.0 | 0.1 | 1.0 |
| | Peroxide crosslinking agent | PERCUMYL D | parts by mass | 2.5 | 2.5 | 2.5 | 2.5 | 2.5 | 2.5 | 3.5 | 1.0 |
| | Thiazole-based crosslinking promorter | NOCCELLER DM-10 | parts by mass | 0 | 0 | 0.1 | 0.1 | 0.8 | 0.8 | 0.1 | 1 |
| | Thiuram-based crosslinking promoter | NOCCELLER TOT-N | parts by mass | — | — | — | — | — | — | — | — |
| EPDM properties | EPDM polymer (exclude extended oil) | | parts by mass | 100 | 100 | 100 | 100 | 100 | 100 | 100 | 100 |
| | Extended oil | | parts by mass | 45 | 45 | 45 | 45 | 45 | 45 | 45 | 45 |
| | Propylene/(Ehylene + Propylene) | | % | 38.3 | 38.3 | 38.3 | 38.3 | 38.3 | 38.3 | 38.3 | 38.3 |
| | $ML_{1+4}$(125° C.) | | | 50.8 | 50.8 | 50.8 | 50.8 | 50.8 | 50.8 | 50.8 | 50.8 |
| Crosslinking properties | t10 | t10 | min | 0.86 | 0.80 | 1.10 | 1.16 | 1.36 | 1.05 | 1.27 | 2.33 |
| | | Evaluation of t10 | | Poor | Poor | Good | Good | Good | Good | Good | Good |
| | t90 | t90 | min | 7.75 | 7.41 | 8.51 | 10.4 | 7.56 | 9.24 | 9.44 | 11.2 |
| | | Evaluation of t90 | | Good | Good | Good | Good | Good | Good | Good | Fair |
| Physical properties in the normal state | Hardness | Hs, Duro A | | 55 | 54 | 53 | 47 | 51 | 51 | 55 | 49 |
| | Tensile strength, Ts | Ts | Mpa | 14.9 | 17.2 | 16.1 | 25.0 | 14.2 | 24.7 | 15.7 | 25.9 |
| | | Evaluation of Ts | | Poor | Excellent | Good | Excellent | Poor | Excellent | Fair | Excellent |
| | Elongation, Eb | Eb | % | 310 | 390 | 380 | 1000 | 550 | 590 | 290 | 740 |
| | | Evaluation of Eb | | Poor | Poor | Poor | Excellent | Excellent | Excellent | Poor | Excellent |
| Heat resistance | Compression set, CS | CS | % | 4 | 12 | 9 | 60 | 14 | 40 | 13 | 52 |
| | | Evaluation of CS | | Good | Good | Good | Poor | Good | Good | Good | Poor |
| Viscoelasticity properties | E'(120° C.)/E'(60° C.) | | | 0.96 | 0.95 | 0.93 | 0.78 | 0.91 | 0.97 | 1.00 | 0.94 |
| | tanδ(60° C.) | | | 0.100 | 0.104 | 0.108 | 0.145 | 0.124 | 0.115 | 0.099 | 0.110 |
| Processability | Kneading performance | Evaluation of kneafing performance | | Good | Good | Good | Good | Good | Good | Good | Good |
| | Blooming | Evaluation of blooming | | Good | Good | Good | Poor | Good | Good | Poor | Fair |

As shown in the results in Table 1 and Table 2, the rubber composition of Examples 1 to 8 were excellent in any of crosslinking properties, physical properties in the normal state, heat resistance, viscoelasticity properties, kneading performance and blooming. On the other hand, the rubber compositions of Comparative Examples 1 to 8 were poor in any of crosslinking properties, ordinary state physical properties in the normal state, heat resistance, viscoelasticity properties, kneading performance and blooming.

What is claimed is:

1. A rubber composition comprising:
   100 parts by mass of an ethylene-propylene-non-conjugated polyene copolymer;
   1 to 3 parts by mass of a peroxide crosslinking agent;
   0.1 to 0.8 parts by mass sulfur; and
   0.1 to 0.6 parts by mass of a thiazole-based crosslinking promoter,
   wherein the ethylene-propylene-non-conjugated polyene copolymer is an EPDM polymer;
   the EPDM polymer has a Mooney viscosity $ML_{1+4}$ at 125° C. of 20 to 80;
   the peroxide crosslinking agent is dicumyl peroxide;
   the thiazole-based crosslinking promoter is dibenzothiazyl disulfide; and
   a content ratio of propylene is 30 to 55 percent by a total content of ethylene and propylene in the ethylene-propylene-non-conjugated polyene copolymer.

2. The rubber composition according to claim 1 wherein t10 of crosslinking properties at 170° C. is 0.9 or more minutes,
   tensile strength after crosslinking is 15.0 MPa or more,
   elongation after crosslinking is 400 percent or more, and
   a compression permanent set at 100° C. for 22 hours is 50 percent or less after crosslinking.

3. The rubber composition according to claim 1 wherein hardness following JIS A hardness is 20 to 90.

4. The rubber composition according to claim 1 wherein the rubber composition is used for a vibration-insulating rubber.

5. The rubber composition according to claim 4 wherein the rubber composition is used for a coupling rubber of a rotational variation absorbing damper.

6. The rubber composition according to claim 2 wherein hardness following JIS A hardness is 20 to 90.

7. The rubber composition according to claim 2 wherein the rubber composition is used for a vibration-insulating rubber.

8. The rubber composition according to claim 3 wherein the rubber composition is used for a vibration-insulating rubber.

9. The rubber composition according to claim 6 wherein the rubber composition is used for a vibration-insulating rubber.

* * * * *